Jan. 24, 1956  D. ROBERTSON  2,732,416
TEMPERATURE-MEASURING APPARATUS
Filed Feb. 1, 1952  3 Sheets-Sheet 1
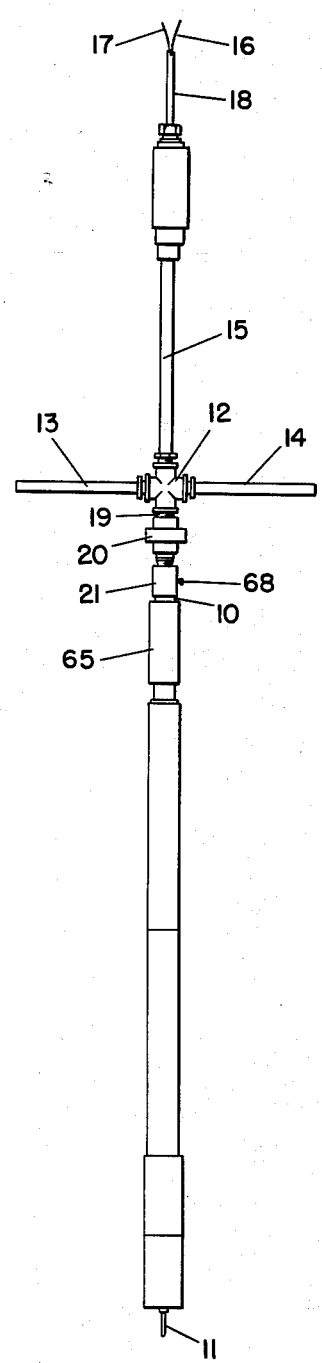
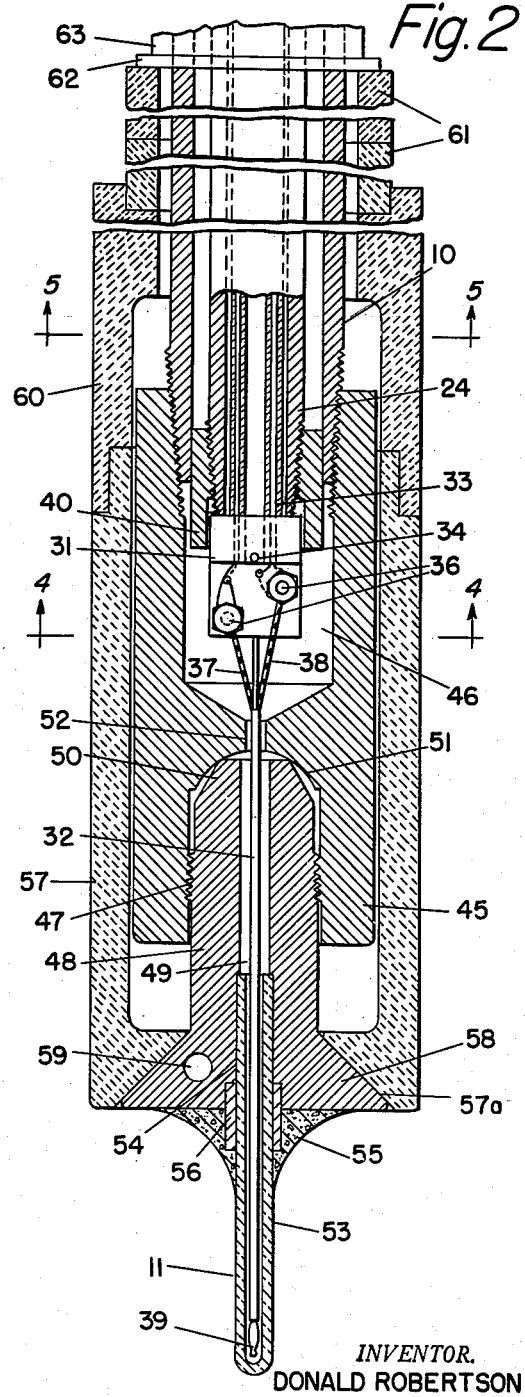
INVENTOR.
DONALD ROBERTSON
BY
Woodcock and Phelan
ATTORNEYS Jan. 24, 1956 D. ROBERTSON 2,732,416
TEMPERATURE-MEASURING APPARATUS
Filed Feb. 1, 1952 3 Sheets-Sheet 2
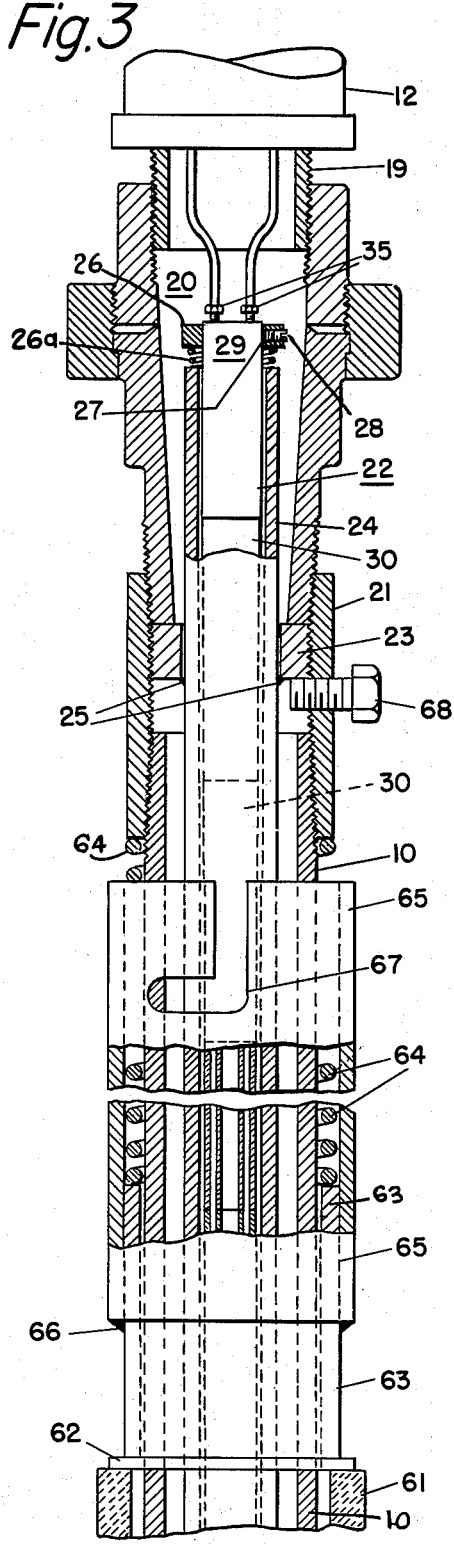
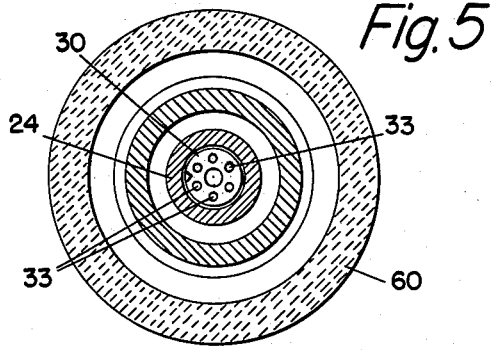
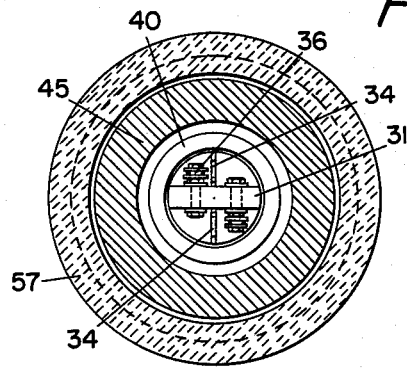
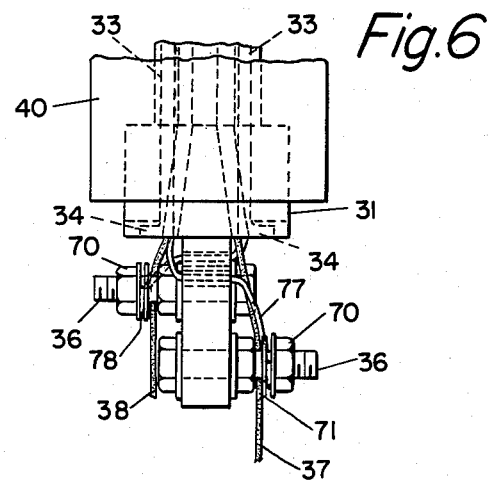
INVENTOR.
DONALD ROBERTSON
BY
Woodcock and Phelan
ATTORNEYS

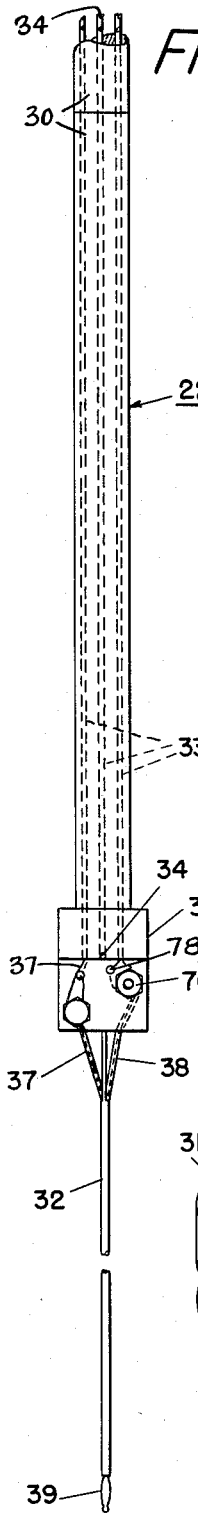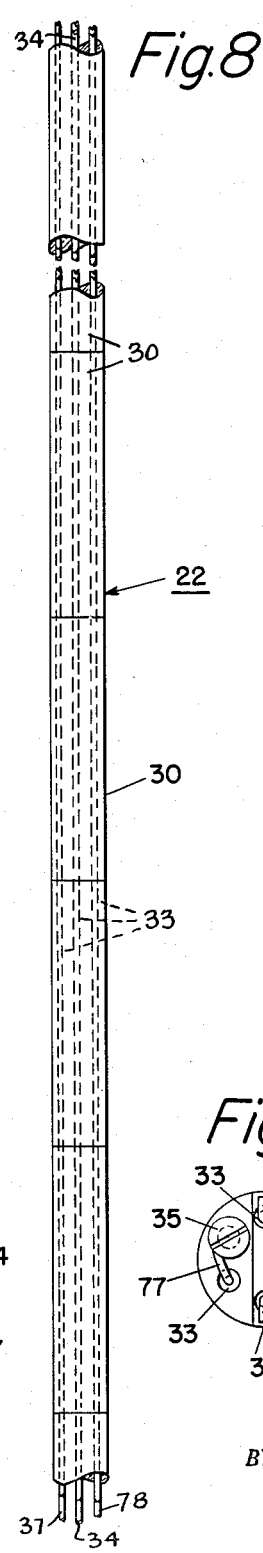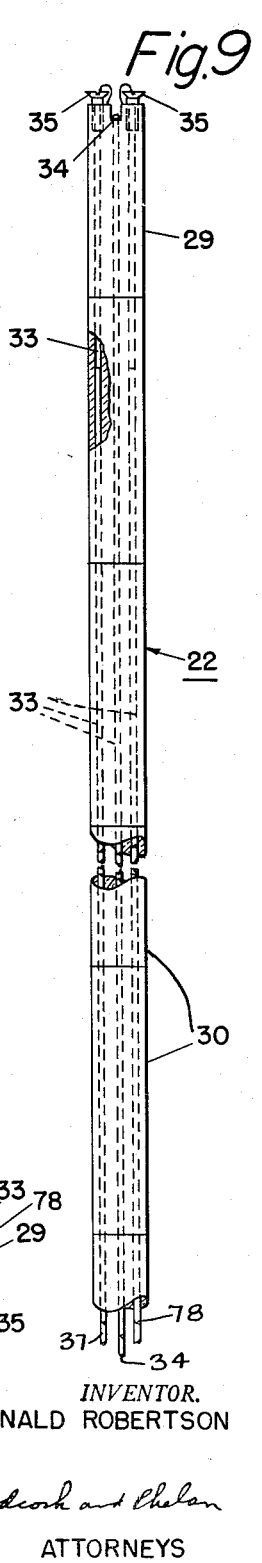

United States Patent Office 2,732,416
Patented Jan. 24, 1956

2,732,416

TEMPERATURE-MEASURING APPARATUS

Donald Robertson, Philadelphia, Pa., assignor to Leeds and Northrup Company, Philadelphia, Pa., a corporation of Pennsylvania Application February 1, 1952, Serial No. 269,428

22 Claims. (Cl. 136—4)

The present invention relates to temperature-measuring apparatus, more particularly immersion-type thermocouples, and has for an object the provision of improvements in immersion-type thermocouples used in measuring the temperature of molten metals and the like, said improvements providing increased accuracy, greater convenience and reliability of the thermocouple equipment.

In the construction of immersion type thermocouples used for measuring temperature of molten metals in the range of about 2700° to 2900° F., thermocouple elements such as platinum and platinum-rhodium are particularly susceptible to contamination when used for such high temperature measurement. The platinum-rhodium material is generally 10% to 13% rhodium and the remainder platinum. While such materials are quite stable at low temperatures, as the temperature is raised to the range indicated, the materials become increasingly more susceptible to contamination.

Since it is desirable to position the measuring thermocouple in a protecting tube, such as a silica tube, for protection of the thermocouple from the metal bath, it has been recognized that contamination of both thermocouple materials is due to silicon in the presence of other elements, but that the contaminating effect only occurs in conjunction with certain gases. In accordance with the present invention, provision is made for preventing such gas from coming in contact with the thermocouple materials either by being generated within the housing or entering it from the outside.

In another aspect of the present invention, provision is made not only to facilitate the replacement of the silica protecting tube surrounding the sensing or measuring section of the thermocouple, but likewise for the renewal of the thermocouple junction when such renewal is desired, or made necessary, as by accidental breakage of the silica tube during insertion or removal from the metal bath.

While previously known thermocouples have made provision for storing additional material for the sensing or measuring section of a thermocouple, the renewal of the thermocouple junction has only been possible by disassembly of the thermocouple protective housing to the point where connection is made between the sensing or measuring leads and the compensating leads, or by mechanical manipulation of the stored wires, resulting in working or bending of the thermocouple material, to permit a new measuring junction to be formed. Where platinum and platinum-rhodium materials are used, the thermal electric and mechanical properties are adversely affected by cold-working of the metal, as by bending and twisting. Accordingly, it is highly desirable to be able to renew the thermocouple junction with minimum mechanical working of the measuring materials. In accordance with still another aspect of the present invention, provision is made for renewing the measuring junction with minimum cold-working of the sensing materials, while retaining convenience and accessibility to the connections between the measuring section of the thermocouple and the extension section through which the thermo-electric potential is transmitted.

In practice, it has been found that with immersion thermocouples of length necessary for submersion of the sensing or measuring section in a metal bath in a furnace of the open-hearth type and through surface slag therein, the total length of the complete assembly may be as much as 12 feet or more. Due to the thermal and mechanical stresses placed on thermocouple materials extending through such a length and through such a temperature gradient as exists between the immersion end of the thermocouple (2700°–2900° F.) and the terminal end at which the leads to a measuring means are connected, if such an assembly is made rigid by mechanically associating at widely separated points parts of differing coefficients of expansion, errors in the measurement may exist and in some instances the thermocouple wires will be strained to the breaking point.

In a preferred form of the invention, provision is made for floatingly supporting a thermocouple measuring assembly within an elongated housing by securing said assembly adjacent an upper terminal block through which the compensating leads are connected to the thermocouple measuring circuits.

Additionally, in long thermocouple assemblies and particularly in those subject to extreme temperatures, differences in expansion and contraction of the thermocouple elements render such thermocouples vulnerable to short or open circuits, thereby affecting the reliability of the instrument in obtaining a temperature measurement. In another aspect of the present invention, provision is made to prevent short or open circuiting as by rotation of the thermocouple elements extending between the measuring junction and the terminals through which the leads for the measuring circuit are connected to the thermocouple assembly. This is accomplished by using multi-holed insulators in the thermocouple assembly and locating binding wires in at least two of the holes to maintain the insulators in alignment to prevent relative rotation of the insulators which, if permitted, strains and may even break the thermocouple wires. The use of such binding wires not only avoids undesirable strain on thermocouple wires but permits use of thinner wires. The thermocouple wires being relatively weak in tension are not capable alone of preventing separation of the insulators and which, hence, would permit relative twisting of the insulators with respect to each other and thereby cause short or open circuits.

In the preferred form of the invention, the thermocouple assembly includes a pair of terminal blocks having a plurality of electrical insulators extending therebetween. The terminal blocks and insulators are provided with a plurality of longitudinal, or axial bores through which the thermocouple extension leads or wires extend, as well as binding wires which secure together the terminal blocks and insulators. These binding wires passing through certain of the longitudinal bores prevent twisting of the insulators and blocks with respect to each other and thereby protect the thermocouple wires from electrical shorts or open circuits, and mechanical strains.

Provision is also made for protecting the measuring section of the thermocouple by means of an extension insulator extending from the lower terminal block toward the measuring junction. This extension insulator is provided with a dividing wall in abutting relation with the terminal block which further insures against shorting of the thermocouple wires.

The lower terminal block provides a connecting means between the measuring section of the thermocouple, including the stored portion of the measuring wires, and the extension wires, which connecting means is readily accessible upon removal of the housing closure plug, the insulating jacket and the internal nose.

By provision of such a unitary thermocouple assembly, including the cooperative disposition between the two terminal blocks and the multi-bore insulators, in accordance with the present invention it is possible to use extension wires between the two terminal blocks made of the same material as that used in the measuring section. With such extension wires it is unnecessary to use compensating leads in that portion of the thermocouple assembly which is subjected to the greatest temperature gradient. As is well understood in the art of temperature measurement with thermocouples, compensating leads have a relatively narrow range of temperatures over which they will compensate correctly and outside of this range the errors become increasingly great. Accordingly, by making it possible to dispense with necessity of using compensating leads by the arrangement of the present invention, it is possible to employ the immersion thermocouple assembly in successive measurements without the necessity of waiting for the unit to cool to a predetermined temperature, in practice, the room temperature. The cooling time for a complete assembly, including the insulating sleeves and housing is necessarily long due to the mass of any such assembly sufficiently rugged to be used in measuring molten metal temperatures in an open hearth furnace or ladle. It is, therefore, of particular importance that such temperature determinations are made possible with a high degree of accuracy while not requiring a long cooling period between "runs."

Further in accordance with the invention, a removable plug is provided with radially extending surface structure or shoulders adapted normally to abut with similar radially extending surface structure on the insulating jacket to form a seal therebetween. Resilient means, such as a coil spring, located at the end of said housing remote from the plug is provided for biasing the jacket toward the plug to maintain the seal between the jacket and the plug.

Still further in accordance with the invention, the housing is provided with an insulated jacket longitudinally movable or slidable along said housing with a plug forming a closure both for the housing and for the jacket. The plug is provided preferably with means accessible on retracting movement of the jacket from engagement with the plug for removing the plug to permit access for installation or renewal of the thermocouple measuring section.

For further objects and advantages of the present invention, reference is to be had to the following detailed description taken in conjunction with the accompanying drawings which form an integral part of the specification.

In the drawings, Fig. 1 is an assembly view of an immersion thermocouple constructed in accordance with the present invention;

Fig. 2 is an enlarged cross-sectional view of the lower end of the immersion thermocouple shown in Fig. 1;

Fig. 3 is an enlarged view, partially in cross-section, illustrating part of the upper portion of the assembly shown in Fig. 1 and is an upward extension of the assembly shown in Fig. 2;

Fig. 4 is a cross-sectional view in the direction of the arrows 4—4 in Fig. 2;

Fig. 5 is a cross-sectional view in the direction of the arrows 5—5 in Fig. 2;

Fig. 6 is a side elevational view of a portion of the lower terminal block assembly shown in Figs. 2 and 4;

Figs. 7, 8 and 9 are elevational views respectively of the lower, middle and upper sections of the thermocouple extension and measuring sections including the upper and lower terminal blocks shown in Figs. 2 and 3;

Fig. 10 is a perspective view of the lower terminal block shown in Figs. 6 and 7; and Fig. 11 is an end view of the upper terminal block shown in Figs. 9 and 3.

Referring to the drawings, and in particular to Fig. 1, there is illustrated an immersion thermocouple assembly constructed in accordance with the present invention, which includes an elongated housing 10 arranged to support a thermocouple sensing or measuring element within a sensing or measuring extension, designated generally as 11. As shown, the housing 10 is supported by connection to a straight cross-pipe fitting 12 to which are connected handle members 13 and 14 and a pipe extension 15. Extension 15 is useful in manipulating the housing 10 for insertion into and removal from a molten metal bath as well as in providing a conduit for compensating leads 16 and 17 in cable 18.

As particularly shown in Fig. 3, housing 10 is supported or connected to cross 12 through a pipe nipple 19, a pipe union 20, the female portion of which threadably engages nipple 19, and a coupling 21. Coupling member 21 provides threadable engagement between the upper end of pipe or housing 10 and the male portion of union 20. Coupling 21 likewise provides a support for the thermocouple extension assembly, designated generally as 22, shown in Figs. 7, 8 and 9, by means of a ring member 23 threadably engaging coupling 21 to which is secured the tube 24 by any suitable means, such as weld 25. For the purpose of floatingly supporting the thermocouple extension assembly 22 within tubing 24, a collar 26 is secured to an upper terminal block 29 by means of set screws 28 threaded into bores 27 in collar 26. A coil spring 26a is seated between the end of tubing 24 and collar 26 to apply a slight amount of tension on thermocouple extension assembly 22, as will be described hereinafter.

As particularly shown in Figs. 7, 8 and 9, the thermocouple extension assembly 22 comprises an upper terminal block 29 (Fig. 9), a plurality of electrical insulators 30 (Fig. 8), a lower terminal block 31, and a thermocouple measuring section which includes insulator 32. Insulators 30 are provided with a plurality of axial or longitudinal bores 33 through which the thermocouple wires and binding members, such as wires 34, pass. Preferably two binding wires 34, Fig. 11, pass through diametrically opposite bores and may be fastened at terminal blocks 29 and 31 by any convenient means such as by crimping or bending the ends, as shown in Figs. 4 and 11, so that the terminal blocks and insulators form a unitary assembly.

In the preferred form of the invention, a pair of thermocouple extension wires 77 and 78, Figs. 6, 10 and 11, are connected, as by soldering, between the terminal screws 35 in terminal block 29 and terminal screws 36 in lower terminal block 31. These extension wires are desirably of the same material as the material used in the measuring section of the thermocouple assembly. By so using thermocouple extension wires of the same material as the thermocouple measuring section, the errors caused by temperature gradient between the two terminal blocks 29 and 31 are to substantial degree eliminated. The sensing or measuring section of the thermocouple assembly, includes wires 37 and 38, joined at a variously designated sensing, measuring or "hot" junction 39, Fig. 2, the thermocouple elements or wires then passing through the extension insulator 32, Fig. 7, which abuts the end of terminal block 31, to make contact with the extension wires 77 and 78 at terminal screws 36 of lower terminal block 31. For the purpose of permitting renewal of junction 39 as desired and when needed, reserve lengths of the thermocouple measuring wires 37 and 38 pass under washers 71 of terminal screws 36 and upwardly into two of the bores 33 in insulators 30, thereby providing adequate replacement lengths of elements for the thermocouple. By providing lower terminal block 31 with means for connecting the thermocouple elements 37 and 38 to the leads formed by extension wires 77 and 78, as shown, the stored lengths of thermocouple elements above block 31 may be pulled straight from the storage space and reclamped at the terminals 35 and 36 with minimum bending and minimum cold-working of the thermocouple materials, matters of importance in temperature measurement. Desirably, the washers 71 are likewise made of the same material as the thermocouple wires, namely, platinum and platinum-rhodium.

As thus far described, it will be apparent that the thermocouple extension assembly and measuring section provides a rugged and composite unit which may be easily installed or replaced within the housing 10 and floatingly supported at the upper end within tubing 24 by means of collar 26 and spring 26a.

As particularly shown in Fig. 2, tubing 24 and housing 10 are arranged readily to constrain the thermocouple extension assembly 22 at the lower end by permitting lower terminal block 31 to contact the lower end of tubing 24. Coil spring 26a, Fig. 3, permits differences in thermal expansion between thermocouple assembly 22 and the tube or housing 24 to take place without substantial disturbance of position of measuring junction 39 with respect to tubing 24. Any differences in length of tubing 24 and assembly 22 due to differences in thermal expansion result in greater or lesser compression of coil spring 26a. Since the measuring section from terminals 36 to junction 39 is relatively short, the position of junction 39 is not greatly changed with respect to tubing 24 with changes in temperature. A sleeve 40, threadably mounted upon the lower end of tubing 24, provides a floating support for tubing 24 with respect to housing 10. By virtue of these floating supports, differential thermal expansion of the housing 10, tubing 24 and the thermocouple extension assembly 22 is possible without inducing stresses or strains in any of these elements.

Tube 24 and housing 10 are preferably made of the same material in order to minimize their differential thermal expansion. Since the sensing or measuring junction 39 in silica tube 53 is definitely positioned with respect to tube 24 and silica tube 53 is definitely positioned with respect to housing 10 by means of plug 48 and nose 45, relative motion of thermocouple junction 39 with respect to tube 53 due to thermal expansion or contraction is minimized.

The lower end, or terminal portion, of housing 10 is provided with a terminal nose or sleeve 45 provided with a bore 46 within which the lower terminal block 31 is positioned. The lower end of the housing element or terminal sleeve 45 is provided with a threaded bore 47 arranged to receive and secure an end closure plug assembly 48 through which the measuring section of thermocouple assembly 22 passes by way of through-bore 49 in plug 48. Plug 48 is preferably provided with a reduced end section 50 formed in a frustoconical configuration adapted to mechanically contact a spherical seat 51 formed at the base of bore 47 in sleeve 45 so that there is formed an annular metal-to-metal seal between the end portion 50 of metallic plug 48 and the metallic sleeve 45. The seal so formed is substantially gas-tight so that gases may not enter the lower portion of housing 10 and contaminate the thermocouple materials within the housing. It will be observed that the upper bore 46 in sleeve 45 communicates with the through-bore 49 in plug 48 and the threaded bore 47 in sleeve 45 by way of a restricted passage 52. The function of restricted passage 52 is well understood in such a construction of the housing 10 and sleeve 45 and is provided to cause solidification of any molten metal which may enter through-bore 49 if the measuring section 11, including silica tube 53, should be damaged or broken while the thermocouple assembly is in the molten metal bath.

As mentioned above, a silica tube 53 forms a protective wall surrounding the thermocouple measuring section 11. Silica tube 53 is preferably received in a counterbore 54 which is concentric with through-bore 49 in plug 48 and is preferably sealed therein by means of cement 55, as shown. While preferably a metal ring 56 surrounds silica tube 53 adjacent the area wherein tube 53 extends beyond plug 48, ring 56 may be omitted without modifying the connection of tube 53 with plug 48. The metal ring 56 facilitates removal of the spent silica tube since the refractory cement 55 is somewhat more adherent to silica than to metal.

In accordance with the present invention, the removal of plug 48 which threadably engages bore 47 in nose or coupling 45 is accomplished by plug-removing means rendered accessible when the lower protective jacket 57 is moved upwardly by sliding jacket 57 away from engagement with the radially extending flange 58 formed integrally with plug 48. In the present embodiment, the foregoing means comprises structure engageable, if desired, by a tool for unscrewing the plug 48 from the nose 45. In its simplest form that structure comprises the walls of a hole 59 bored transversely through the body of plug 48 adjacent the flanged portion 58. Any elongated member (not shown) such as a screw driver may be used to loosen the plug for removal.

While the radially extending flanges 57a and 58 have been shown as of frusto-conical configuration, it will be understood that other configurations may be employed on these abutting surfaces. They may be flat, spherical or respectively concave and convex. These radially extending flanges or shoulders 57a and 58 are so formed that a seal against the entrance of liquid metal is provided between the jacket section 57 and plug 48.

The insulating jacket 57 of refractory material preferably extends along the greater portion of sleeve 45, and the upper end thereof is desirably formed with a rabbeted or interlocking joint complementary with a further jacket section 60 which encloses the upper portion of sleeve 45 and a portion of housing 10.

By so forming the ends of the jacket sections with overlapping complementary shapes, as the ends of sections 57 and 60, further liquid-metal seals are formed to protect the housing 10 and the terminal portion thereof including sleeve 45 and plug 48. As shown, the jacket section surrounding housing 10 includes a plurality of additional sections 61, Fig. 2, which act to transmit a longitudinal thrust applied through an annular washer 62, sleeve 63 and coil spring 64 to bias the lower end of jacket section 57 into engagement with the shoulder section of plug 48. As shown, a biasing means, coil spring 64 (Fig. 3), is seated against coupling 21. For the purpose of removing the spring-biasing force on insulating jacket sections 57, 60 and 61, an outer sleeve member 65 is secured to sleeve member 63 as by weld 66. Sleeve 65 preferably surrounds coil spring 64 and is provided with a bayonet joint indicated as 67 which may be brought into engagement with lock screw 68 by retracting sleeves 65 and 63 to compress spring 64. Locking is accomplished by rotation of the sleeve member to bring the lower portion of bayonet joint 67 into engagement with bolt 68. While the bayonet joint 67 in Fig. 3 is shown completely out of engagement with bolt 68 for clarity of illustration, in practice sleeve 65 desirably will be sufficiently long so that the longitudinal or axial portion of bayonet joint 67 will at all times engage the bolt 68 in avoidance of need to move the open end of slot 67 to bolt 68.

In operation, when it is desired to renew or install a new thermocouple section within silica tube 53, Fig. 2, the jacket sections 57, 60 and 61 will be retracted along the length of housing 10 by relieving the spring thrust produced by coil spring 64, Fig. 3, by upward movement of sleeve 65 so that the bayonet joint 67 is engaged and held by bolt 68. With jacket section 57 so retracted, Fig. 2, the plug member 48 may be removed from sleeve 45 by insertion of a tool into hole 59 threadably to disengage from bore 47 in sleeve 45 the plug 48 and its attached silica tube 53. In practice, it is normally desirable to change the silica tube with each heat-determining run made with the immersion thermocouple assembly. Accordingly, a series of plugs 48 may be pre-assembled by insertion of silica tubes 53 therein with application of cement 55 thereto, or the silica tube may be replaced in the same plug 48 between each heat run without removal of plug 48 from nose 45. While it is desirable to replace the silica tube with each run, by virtue of the present invention it is unnecessary to renew the thermocouple junction unless through breakage of the silica tube during a heat-measuring run the thermocouple suffers injury or deterioration. The silica tube normally excludes from its interior and the interior of the housing substantially all possibility of contaminating gas coming in contact with the measuring materials. As mentioned hereinabove, with previously known immersion thermocouples, such gas could be generated either within the assembly or could invade the housing from outside.

In the event that damage should occur to the silica tube during a heat-measuring run, the injured part of the measuring section of the thermocouple assembly may be easily and conveniently replaced after plug 48 is removed by slipping the jacket section 57 away from the sleeve 45 and then by suitable wrench means unthreading sleeve 45 from the lower end of tubing or housing 10, thus providing access to the lower terminal block 31.

As mentioned hereinbefore, the thermocouple leads from the sensing section 11 extend beyond the terminal screws and upwardly into two of the axial or longitudinal holes 33 in the insulators 30. As particularly shown in the side view in Fig. 6 and the perspective view in Fig. 10, these wires merely pass around the studs 36 and are so arranged with respect to the thermocouple extension wires 77 and 78 that there is contact between the extension leads 77 and 78 and the thermocouple measuring wires 37 and 38 through washers 71 which are constructed of the same material as the thermocouple wires. A particular advantage in this latter arrangement is that under the elevated temperatures within the terminal portion of housing 10, although the studs, washers and nuts, not made of the same materials as the thermocouple wires, may become oxidized, the noble metal washers 71 maintain low-resistance electrical contact between the measuring thermocouple leads 37 and 38 and the extension leads 77 and 78.

From the foregoing description it will be apparent that merely by loosening the nut 70 on terminal screw 36 a renewal section of thermocouple wire 37 or 38 may be pulled under washer 71 and passed downwardly through the thermocouple extension insulator 32 so that the thermocouple measuring junction may be reformed at the lower end thereof in the measuring extension 11 of the thermocouple assembly. Ordinarily the replacement lengths of the thermocouple elements will be great enough (six to twelve feet long) as compared with the length (about six inches) of the thermocouple from terminal means 36 to hot junction 39 to permit a number of replacements of the thermocouple.

While various modifications and changes in the foregoing embodiment of the invention will be apparent to those skilled in the art, all such modifications and changes as are within the scope of the appended claims are intended to be embraced thereby.

What is claimed is:

1. An assembly for measuring temperature comprising a housing, a plug removably secured to said housing and having a passage extending lengthwise thereof and closed at the end remote from said housing, a sensing element within said closed end of said plug, said plug having radially extending surface structure, and means including an insulating jacket surrounding said housing and said plug and having radially extending surface structure normally abutting and pressed against that of said plug to form a seal therewith and slidable relative to said housing for access to the interior thereof.

2. The combination set forth in claim 1 in which said insulated jacket is maintained in place by resilient means applying pressure to the upper end of said insulated jacket, said resilient means being disposed to bear against a pressure applying element, said element being movable relative to said housing, and means for securing said pressure applying element in fixed position to compress said resilient means and displace said element away from the upper end of said jacket for removal of pressure therefrom during inspection of said sensing element.

3. An assembly for measuring temperature including a sensing element and comprising a housing, a plug removably secured to said housing and having for said sensing element a passage extending lengthwise thereof and closed at the end remote from said housing, said plug having a radially extending flange, an insulating jacket slidable along said housing and having a radially extending flange normally abutting against that of said plug to form a seal therewith, and means accessible upon sliding of the jacket away from the plug for removing the plug from said housing for access to said sensing element.

4. The combination set forth in claim 3 in which said insulating jacket is in the form of a plurality of sections having overlapping complementary shapes forming seals between said sections and including spring means located at the end remote from said plug for biasing said jacket as a whole toward said plug and to maintain the several seals at the junctures of said sections and at the juncture with said plug.

5. The combination set forth in claim 3 in which said radially extending flanges have abutting surfaces, one of which is frusto-conical and the other of which is of complementary frusto-conical shape.

6. The combination set forth in claim 3 in which said sensing element comprises a thermocouple having elements which extend through said passage of said plug and which terminate in a measuring junction at a point adjacent the closed end thereof, terminal means within said housing in a region adjacent said plug, terminal means within said housing at the end thereof remote from said plug, conductors rigidly secured to both of said terminal means and extending between them within said housing, said thermocouple elements being connected to said terminal means adjaent said plug, and said thermocouple elements extending beyond and being adjustable relative to the last-named terminal means for renewal of said measuring junction of said thermocouple as may be desired.

7. The assembly in accordance with claim 3 in which the end of said housing receiving said plug has formed therein wall means for removably securing said plug, said wall means being formed to sealably engage an end portion of said plug to form a metal to metal seal between said end portion of said plug and said end of said housing.

8. In an immersion type thermocouple for measuring molten metal temperatures, an elongated housing having a terminal portion adapted for immersion in molten metal, a heat-insulating jacket section surrounding said portion, said section being longitudinally movable with respect to said terminal portion, resilient means for urging said jacket section into engagement with a plug member, said plug member being detachably connected to said terminal portion and having an elongated shield portion adapted to surround a measuring thermocouple junction extending axially beyond said terminal portion, electrical connecting means including a first terminal block positioned in said terminal portion and a second terminal block adjacent the opposite end of said housing, said second terminal block providing connecting means for an external measuring circuit and at least a pair of thermocouple extension leads, electrical insulating members extending longitudinally between said first and second terminal blocks, said insulating members having a plurality of longitudinal holes therethrough, said extension leads passing through two of said holes and terminating at said second terminal block, thermocouple wires passing through at least two other of said holes and extending beyond said first terminal block to a thermocouple junction in said shielded portion, and means for electrically connecting said thermocouple wires and extension leads at said first terminal block.

9. An assembly for measuring temperature comprising a housing having electrical terminal means disposed therein adjacent an open end thereof, coupling means at said open end of said housing being formed with a spherical surface, a plug having a surface adapted to seat against said spherical surface for closing the end of said housing, said plug having a passage extending lengthwise thereof and closed at the end remote from the housing and open at the opposite end to communicate with the interior of said housing, thermocouple elements comprising wires extending lengthwise of said housing and secured together at their ends in the region adjacent the closed end of said plug to form the sensing junction of a thermocouple, said wires being secured intermediate their ends to said electrical terminal means to provide electrical connections with the lengths of said thermocouple elements extending into the housing beyond said terminal means to form a reserve supply of thermocouple elements for renewing said sensing junction, an insulating jacket for said housing, said plug having plug-removing means normally covered by said jacket engageable upon access thereto for attaching and detaching said plug from said coupling means, resilient means biasing said jacket against said plug to permit movement of said jacket against the bias of said resilient means to render said plug-removing means accessible, said jacket upon removal of said plug exposing said thermocouple and permitting access to said coupling means for removal thereof for renewal of said sensing junction and adjustment of the length of the thermocouple elements relative to said terminal means.

10. A thermocouple assembly comprising a first terminal block, a second terminal block, a plurality of electrical insulating members extending longitudinally between said first and second terminal blocks, said insulating members having a plurality of longitudinal bores therethrough, binding members extending through at least a pair of said bores and means for securing said binding members to said first and second terminal blocks to secure said terminal blocks and said plurality of insulating members together as an assembly, at least a pair of thermocouple extension elements extending through other of said bores and connected with both of said terminal blocks and providing electrical connections between said extension elements and at least a pair of thermocouple sensing elements, said sensing elements being connected to and extending in both directions from said second terminal block, and said sensing elements being connected together at one end to form a sensing junction.

11. A combination in accordance with claim 10 with the addition of means including a sensing junction section supporting insulator means extending longitudinally from said second terminal block toward said sensing junction.

12. A thermocouple assembly comprising terminal means, a plurality of electrical insulating members, said insulating members having a plurality of longitudinal passages formed therein, binding members extending through said insulating members and said terminal means to form a unitary assembly of said terminal means and said insulating members, at least a pair of thermocouple extension elements extending through said longitudinal passages and connected at said terminal means, and at least a pair of thermocouple sensing elements extending through other of said longitudinal passages in said insulating members, said sensing elements being connected together at one end to form a temperature-sensing junction and being connected intermediate the ends thereof at said terminal means to said thermocouple extension elements, and said sensing elements being movable longitudinally with respect to said terminal means to permit the renewal of said temperature-sensing junction and the position thereof with respect to said terminal means.

13. A thermocouple assembly comprising first terminal means, second terminal means, a plurality of electrical insulating members extending longitudinally between said first and second terminal means, said insulating members having a plurality of longitudinal passages formed therein, binding members extending from said first to said second terminal means and secured thereto to form a unitary assembly of said terminal means and said insulating members, at least a pair of thermocouple extension elements extending through said longitudinal passages and connected at both of said terminal means, and at least a pair of thermocouple sensing elements extending through other of said longitudinal passages in said insulating members, said sensing elements being connected together at one end to form a temperature-sensing junction and being connected intermediate the ends thereof at one of said terminal means to said thermocouple extension elements, and said sensing elements being movable longitudinally with respect to said one terminal means to permit the renewal of said junction and the positioning thereof with respect to said one terminal means.

14. An assembly for measuring temperature comprising a housing, a plug removably secured to said housing and having a passage extending lengthwise thereof and closed at the end remote from said housing, said plug having radially extending surface structure, an insulating jacket slidable along and over said housing and having radially extending surface structure normally abutting against that of said plug to form a seal therewith, a thermocouple subassembly comprising a first terminal block, a second terminal block and a plurality of electrical insulating members extending longitudinally between said first and second terminal blocks, binding members extending through said first and second terminal blocks and said plurality of insulating members for securing said blocks and said members together as a second subassembly, a thermocouple temperature-sensing section supported from said second terminal block, means for floatingly supporting said thermocouple subassembly in said housing, and positioning said section within said passage in said plug adjacent said closed end while permitting differential thermal expansion of said second subassembly and said housing without application of stresses upon said thermocouple subassembly, and terminal posts establishing a reference point for said second subassembly adjacent said second terminal block.

15. A temperature-measuring assembly comprising a housing, metal coupling means at an end of said housing having formed therein a spherical surface, a metal plug having a surface adapted to seat against said spherical surface to provide a metal-to-metal gas seal therebetween, said plug having a passage formed therein to communicate with said housing through said seal, said plug having outwardly extending radial surface structure, an insulating jacket slidable around and along said housing and having inwardly extending radial surface structure normally abutting said radial structure of said plug, and a spring biasing said radial structures toward each other.

16. A temperature-sensitive assembly comprising a plurality of insulating members having a plurality of alignable longitudinal passages therein, at least a pair of electrically isolated binding members positioned in certain of said passages to align said plurality of insulating members as a unitary assembly, leads from a heat responsive element positioned in other of said passages, electrical terminal means adjacent an end of said assembly of insulating members, said leads being secured to said terminal means and extending therefrom to said heat responsive element.

17. A temperature-measuring assembly comprising a housing, a plug removably secured to said housing and having radially extending surface structure, an outer insulating jacket encircling said plug and having radially extending surface structure disposed for engagement with said radial structure of said plug to form a seal, said plug in a region protected by said jacket when forming said seal having structure for removal of said plug from said housing, said structure being rendered accessible by sliding movement of said jacket out of engagement with said radial structure of said housing.

18. A temperature-measuring assembly comprising an elongated housing, a tube disposed within said housing and having an end portion secured to said housing, the opposite end of said tube having a surface forming an abutment, a thermocouple assembly extending lengthwise of said tube and having a surface engaging said abutment of said tube, and means located at the end portion of said tube remote from said abutment for biasing said thermocouple assembly for movement as a whole to maintain said surfaces in abutting relation.

19. For use in the measurement of temperatures of molten metal, a temperature-measuring assembly comprising an elongated rigid tubular housing, a removable terminal member having a radially extending surface structure secured to an end of said housing and having an opening centrally thereof in alignment with that of said housing, a thermocouple assembly extending lengthwise of said housing and outwardly thereof and beyond said terminal member, means for supporting said assembly within said housing, a protective sleeve surrounding the extending end of said assembly and having a seal between it and said housing to prevent ingress of molten metal into said housing, a removable protective sleeve for said housing comprising a plurality of sections, a first of said sections having radially extending surface structure engaging said radial structure of said terminal member, the remaining sections of said sleeve having radial surfaces in abutting relation one with the other and with said first section, and means including a spring secured at one end to said housing for applying a spring pressure against said sections and said sleeve to press them one against the other and to maintain said first section in sealing engagement with said terminal member.

20. The combination set forth in claim 19 in which a tube is disposed within said housing having an end portion secured thereto, the opposite end of said tube having a surface forming an abutment, said thermocouple assembly extending lengthwise of said tube and having a surface engaging said abutment of said tube, and means located at the end portion of said tube remote from said abutment for biasing said thermocouple assembly for movement as a whole to maintain said surfaces in abutting relation.

21. An immersion thermocouple comprising a thermocouple assembly, tubular structure for said thermocouple assembly, an outer housing surrounding said tubular structure, a plurality of cylindrical protective sleeves having a central bore of a diameter such that said sleeves are slidable along said outer housing, said sleeves having end faces which when pressed together form molten-metal-proof joints, structure secured to said outer housing against which one of said outermost sleeves rests, and biasing means acting on the other of said outermost sleeves for pressing all of said sleeves in the direction of said first-mentioned outermost sleeve to maintain molten-metal-proof said joints formed by said end faces.

22. In an immersion type thermocouple for measuring molten metal temperatures, sensing elements joined together to form a thermocouple junction, an elongated housing having an end portion thereof adapted for immersion in molten metal, a heat-insulating jacket section surrounding said portion, said section being slidable along said end portion, resilient means for urging said jacket section into engagement with a plug member, said plug member being detachably connected to said end portion and having an elongated shielding portion adapted to surround said thermocouple junction, leads for applying the thermoelectric voltage from said thermocouple junction to a measuring circuit, and electrical connecting means positioned in said end portion adjacent said plug member for interconnecting said elements of said thermocouple junction and said leads, said elements including a first portion extending from said connecting means longitudinally through said end portion into said plug member and terminating in said thermocouple junction and a second portion thereof extending within said housing in the opposite direction longitudinally away from said connecting means to provide replacement lengths of said thermocouple elements.

References Cited in the file of this patent

UNITED STATES PATENTS

| | | |
|---|---|---|
| 267,609 | Slafter | Nov. 14, 1882 |
| 1,979,085 | Vollrath | Oct. 30, 1934 |
| 2,002,532 | Flatley | May 28, 1935 |
| 2,463,427 | Richards | Mar. 1, 1949 |